(12) United States Patent
Sun et al.

(10) Patent No.: US 8,609,805 B2
(45) Date of Patent: Dec. 17, 2013

(54) COPOLYETHER GLYCOL MANUFACTURING PROCESS

(75) Inventors: Qun Sun, Wilmington, DE (US); Gary L. Kiser, Newark, DE (US); Robert D. Orlandi, Landenberg, PA (US)

(73) Assignee: Invista North America S.A R.L., Wilmington, DE (US)

(*) Notice: Subject to any disclaimer, the term of this patent is extended or adjusted under 35 U.S.C. 154(b) by 66 days.

(21) Appl. No.: 13/247,794

(22) Filed: Sep. 28, 2011

(65) Prior Publication Data

US 2012/0259090 A1 Oct. 11, 2012

Related U.S. Application Data

(63) Continuation-in-part of application No. 12/424,102, filed on Apr. 15, 2009, now abandoned.

(51) Int. Cl.
*C08G 65/20* (2006.01)
*C08G 65/30* (2006.01)

(52) U.S. Cl.
USPC ........... 528/417; 528/408; 528/411; 528/414; 528/416; 528/421; 526/64; 526/67; 526/68

(58) Field of Classification Search
USPC ..................................... 526/67, 68
See application file for complete search history.

(56) References Cited

U.S. PATENT DOCUMENTS

| | | | |
|---|---|---|---|
| 3,282,875 A | 11/1966 | Connolly et al. | |
| 4,139,567 A | 2/1979 | Pruckmayr | |
| 4,153,786 A | 5/1979 | Pruckmayr | |
| 4,163,115 A | 7/1979 | Heinsohn et al. | |
| 4,192,943 A | 3/1980 | Robinson | |
| 4,228,272 A | 10/1980 | Del Pesco | |
| 4,251,654 A | 2/1981 | Robinson et al. | |
| 4,306,058 A | 12/1981 | Copelin | |
| 4,500,705 A | 2/1985 | Copelin | |
| 4,564,671 A | 1/1986 | Mueller | |
| 4,585,592 A | 4/1986 | Mueller | |
| 4,658,065 A | 4/1987 | Aoshima et al. | |
| 4,728,722 A | 3/1988 | Mueller | |
| 4,762,951 A | 8/1988 | Mueller | |
| 4,933,503 A | 6/1990 | Mueller | |
| 5,118,869 A | 6/1992 | Dorai et al. | |
| 5,149,862 A | 9/1992 | Dorai et al. | |
| 5,268,345 A | 12/1993 | Mueller | |
| 6,197,979 B1 | 3/2001 | Becker et al. | |
| 6,716,937 B2 | 4/2004 | Bohner et al. | |

FOREIGN PATENT DOCUMENTS

| | | |
|---|---|---|
| DE | 4433606 | 3/1996 |
| DE | 19641481 | 4/1998 |
| DE | 19649803 | 7/1998 |
| WO | WO03/076453 | 9/2003 |
| WO | WO03/076494 | 9/2003 |

OTHER PUBLICATIONS

Bednarek et al., Mech. of cyclics formation in the cationic copolymerization of tetrahydrofuran with ethylene oxide in the presence of diols (Macromol Chem Phys, 200, 2443-7, 1999).

*Primary Examiner* — Randy Gulakowski
*Assistant Examiner* — Rachel Kahn
(74) *Attorney, Agent, or Firm* — Robert B. Furr, Jr.; Dennis P. Santini

(57) ABSTRACT

The present invention provides a highly efficient process for manufacturing copolyether glycol having a mean molecular weight of from about 650 to about 5000 dalton by polymerization of tetrahydrofuran and at least one alkylene oxide in the presence of an acid catalyst and at least one compound containing reactive hydrogen atoms. More particularly, the invention relates to a process for manufacturing copolyether glycol which comprises recycle to the polymerization reaction step of at least a portion of the oligomeric cyclic ether which is co-produced with the copolyether glycol, said process exhibiting an Space Time Yield value of greater than about 0.9.

25 Claims, 2 Drawing Sheets

COPOLYETHER GLYCOL MANUFACTURING PROCESS

RELATED APPLICATION

This application is a continuation-in-part of U.S. application Ser. No. 12/424,102, filed Apr. 15, 2009, incorporated herein by reference.

FIELD OF THE INVENTION

The present invention relates to a highly efficient process for manufacturing polyether glycols by polymerization of tetrahydrofuran and at least one alkylene oxide in the presence of an acid catalyst and at least one compound containing reactive hydrogen atoms. More particularly, the invention relates to a process for manufacturing polyether glycols which comprises recycle to the polymerization reaction of at least a portion of the oligomeric cyclic ethers which are co-produced with the polyether glycols.

BACKGROUND OF THE INVENTION

Homopolymers of tetrahydrofuran (THF), also known as polytetramethylene ether glycols (PTMEG), are well known for use as soft segments in polyurethanes and other elastomers. These homopolymers impart superior dynamic properties to polyurethane elastomers and fibers. Copolymers of THF and at least one cyclic ether, also known as copolyether glycols, are known for use in similar applications, particularly where the reduced crystallinity imparted by the cyclic ether may improve certain dynamic properties of a polyurethane which contains such a copolymer as a soft segment. Among the cyclic ethers used for this purpose are ethylene oxide and propylene oxide.

Copolymers of THF and at least one cyclic ether are well known in the art. Their preparation is disclosed, for example, by Pruckmayr in U.S. Pat. No. 4,139,567 and U.S. Pat. No. 4,153,786. Such copolymers can be prepared by any of the known methods of cyclic ether polymerization, described for instance in "Polytetrahydrofuran" by P. Dreyfuss (Gordon & Breach, N.Y. 1982). Such polymerization methods include catalysis by strong proton or Lewis acids, by heteropoly acids, as well as by perfluorosulfonic acids or acid resins. In some instances it may be advantageous to use a polymerization promoter, such as a carboxylic acid anhydride, as disclosed in U.S. Pat. No. 4,163,115. In these cases the primary polymer products are diesters, which need to be hydrolyzed in a subsequent step to obtain the desired polyether glycols.

In THF copolymerization, as well as in THF homopolymerization, oligomeric cyclic ethers (OCE) are often co-produced with the polyether glycols. Depending on the catalyst and on the polymerization conditions, the polymerization product stream may have an OCE content ranging from low levels upwards to about 18 percent by weight (wt %) OCE, as disclosed for example in U.S. Pat. Nos. 4,192,943; 4,228,272; 4,564,671; 4,585,592; and published patent applications WO 03/076453 and WO 03/076494. For example, U.S. Pat. No. 4,564,671 discloses a process for copolymerization of THF with a 1,2-alkylene oxide in the presence of a compound containing reactive hydrogen and a fixed-bed clay catalyst in which less than 30% by weight of a mixture of THF, 1,2-alkylene oxide, and a compound containing reactive hydrogen is added to the reaction mixture, which is then recycled to the reactor. The latter patent discloses that virtually no by-products, in particular no cyclic oligomers, are formed during the copolymerization. U.S. Pat. No. 4,728,722 discloses that the formation of significant amounts of OCE is avoided if the THF is polymerized batchwise with a 1,2-alkylene oxide in the presence of compounds containing reactive hydrogen over a bleaching earth or zeolite catalyst, the 1,2-alkylene oxide being fed to the reaction mixture in such a manner that the concentration of the 1,2-alkylene oxide in the reaction mixture is kept below 2% by weight during the polymerization. U.S. Pat. No. 5,268,345 discloses that in the copolymerization of THF with ethylene oxide (EO), the formation of undesirable OCE is significantly reduced when montmorillonite catalyst which has been regenerated by the process disclosed therein is used. U.S. Pat. No. 4,192,943 discloses that the OCE content of copolyether glycols based on THF and alkylene oxides varies with their method of production and further discloses that raw polymerizates usually contain from about 7 to about 15% by weight of the ethers, and in some cases may contain as much as from 15 to 18% by weight.

Other process mechanisms are proposed in the art for production of polytetrahydrofuran and/or tetrahydrofuran copolymers, such as U.S. Pat. No. 6,716,937, which includes various separation and fractionation steps. The process of this later patent is exemplified to be much less efficient than desirable, since the Space Time Yield (STY) results, calculated as shown below, for the examples are 0.012, 0.020 and 0.011 g PTHF/g cat. hr, respectively.

The OCE in PTMEG or copolyether glycol product is generally undesirable. Lacking hydroxyl groups, OCE is an inert material, and when the copolyether glycols are reacted with diisocyanates in the preparation of polyurethanes, the inert OCE can have an adverse effect on, for example, the mechanical properties of the finished products. The OCE can act as softeners and in general cause deterioration in the mechanical properties of the finished polyurethane products. The OCE may furthermore be exuded at the surface of the finished products or be dissolved out by solvents, with the result that, for example, the dimensional stability of the finished products is adversely affected. Furthermore, the OCE is a yield loss and, if separated and isolated from the desired copolyether glycol, a waste stream that requires disposal is formed.

Various methods to reduce the amount of OCE co-produced in the polymerization of THF and alkylene oxide have been disclosed. U.S. Pat. No. 4,192,943 discloses, for example, that the OCE content is significantly reduced by bringing the polymerizates into contact with an acid-activated sodium or calcium montmorillonite clay. The OCE content of THF/alkylene oxide polymerizates can be reduced by extraction with water, as disclosed in U.S. Pat. No. 4,251,654, or with aliphatic and cycloaliphatic hydrocarbons, as disclosed for example in U.S. Pat. No. 4,500,705, or with a solvent mixture consisting of an alkanol, a hydrocarbon, and water, as disclosed in U.S. Pat. No. 4,762,951. Reduction of OCE content by extraction with a supercritical gas is disclosed in U.S. Pat. No. 4,306,058. Alternatively, the content of OCE in copolyether glycol products can be reduced by subjecting the copolyether glycol to distillation under reduced pressure at above 200° C., as disclosed in U.S. Pat. No. 4,585,592. Reduction of OCE content by distillation under reduced pressure followed by extraction with a particular solvent mixture is disclosed in U.S. Pat. No. 4,933,503.

The above methods to minimize co-production of OCE or to reduce the amount of OCE in the polymerization product can add complexity, processing limitations, and/or cost to the manufacturing process. A simple economical, highly efficient process for the copolymerization of THF and alkylene oxide which avoids OCE yield loss and/or copolyether glycol contamination with OCE, said process providing a high STY is needed.

SUMMARY OF THE INVENTION

The present invention provides a simple economical, highly efficient process for the copolymerization of THF and alkylene oxide which minimizes or avoids OCE yield loss and/or copolyether glycol contamination with OCE.

The process comprises the steps of:

a) polymerizing tetrahydrofuran and at least one alkylene oxide in the presence of an acid catalyst and at least one compound containing reactive hydrogen atoms at a temperature of from about 50° C. to about 80° C. to produce a polymerization product mixture comprising OCE, copolyether glycol having a mean molecular weight of from about 650 dalton to about 5000 dalton, at least one dimer of the alkylene oxide, linear short chain copolyether glycol and tetrahydrofuran;

b) separating a majority of the tetrahydrofuran and the dimer of the alkylene oxide from the polymerization product mixture of step a) to produce a crude product mixture comprising OCE, copolyether glycol having a mean molecular weight of from about 650 dalton to about 5000 dalton and linear short chain copolyether glycol;

c) separating at least a portion of the OCE and linear short chain copolyether glycol from the crude product mixture of step b) to produce an OCE stream comprising OCE and linear short chain copolyether glycol, and a product stream comprising copolyether glycol having a mean molecular weight of from about 650 dalton to about 5000 dalton; and d) recycling at least a portion of the OCE stream of step c) to the polymerization step a).

The present invention, therefore, provides a process for manufacturing poly(tetramethylene-co-ethyleneether) glycol having a mean molecular weight of from about 650 dalton to about 5000 dalton comprising the steps of:

a) polymerizing tetrahydrofuran and ethylene oxide in the presence of an acid catalyst and at least one compound containing reactive hydrogen atoms selected from the group consisting of water, 1,4-butanediol, poly(tetramethylene ether) glycol having a molecular weight of from about 130 dalton to about 400 dalton, and poly(tetramethylene-co-ethyleneether) glycol having a molecular weight of from about 130 dalton to about 400 dalton, at a temperature of from about 50° C. to about 80° C., to produce a polymerization product mixture comprising OCE, poly(tetramethylene-co-ethyleneether) glycol, 1,4-dioxane, linear short chain copolyether glycol and tetrahydrofuran;

b) separating a majority of the tetrahydrofuran and the 1,4-dioxane from the polymerization product mixture of step a) to produce a crude product mixture comprising OCE, poly(tetramethylene-co-ethyleneether) glycol and linear short chain copolyether glycol;

c) separating at least a portion of the OCE and linear short chain copolyether glycol from the crude product mixture of step b) to produce an OCE stream comprising OCE and linear short chain copolyether glycol, and a product stream comprising poly(tetramethylene-co-ethyleneether) glycol; and d) recycling at least a portion of the OCE stream of step c) to the polymerization step a).

DETAILED DESCRIPTION OF THE INVENTION

Figure 1:
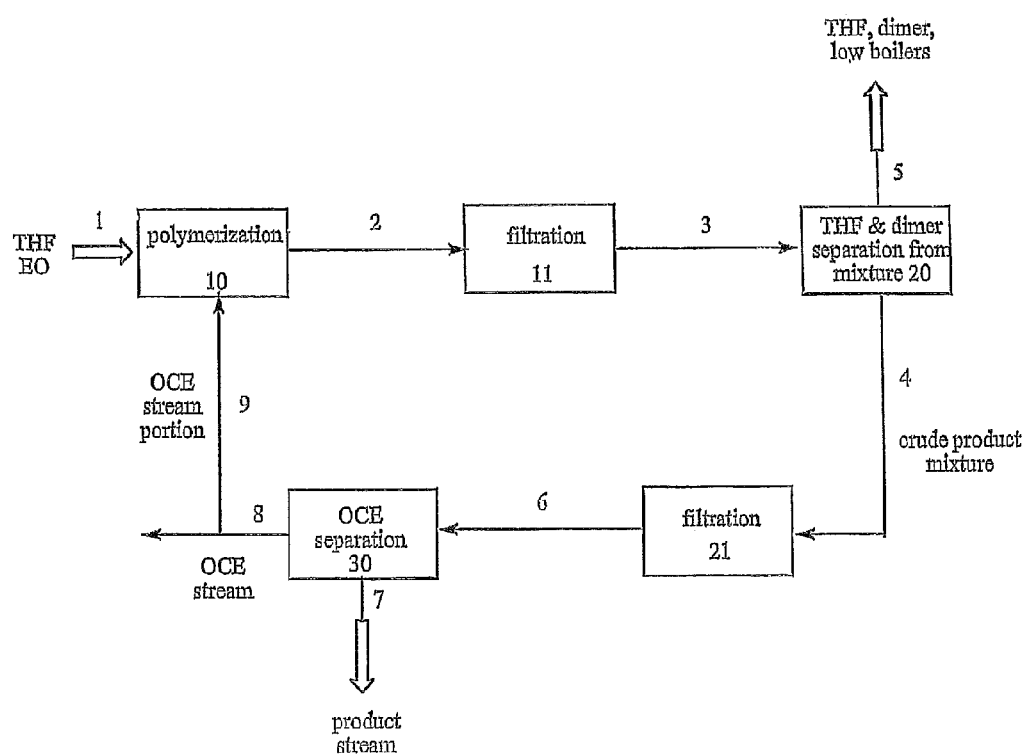
FIG. 1 shows a diagrammatic flow of an embodiment of the present process.

As a result of intense research in view of the above, we have found that we can manufacture copolyether glycols having a mean molecular weight of from about 650 dalton to about 5000 dalton unencumbered by significant coproduced undesirable OCE, in a process providing a high STY of greater than about 0.9, for example from about 1.0 to about 3.0. The process of the invention comprises the step of polymerization of THF and at least one alkylene oxide in the presence of an acid catalyst and at least one compound containing reactive hydrogen atoms. Following the polymerization step, the unreacted THF, unreacted alkylene oxide, dimer of the alkylene oxide, and any lower boiling components present are removed, and the copolyether glycol fraction is, for example, distilled to remove at least a portion of the OCE. The OCE portion removed is then recycled to the polymerization step, where it can be incorporated into the copolyether glycol product.

The term "polymerization", as used herein, unless otherwise indicated, includes the term "copolymerization" within its meaning.

The term "PTMEG", as used herein, unless otherwise indicated, means poly(tetramethylene ether glycol). PTMEG is also known as polyoxybutylene glycol.

The term "copolyether glycol", as used herein in the singular, unless otherwise indicated, means copolymers of tetrahydrofuran and at least one 1,2-alkylene oxide, which are also known as polyoxybutylene polyoxyalkylene glycols. An example of a copolyether glycol is a copolymer of tetrahydrofuran and ethylene oxide. This copolyether glycol is also known as poly(tetramethylene-co-ethyleneether) glycol.

The term "linear short chain copolyether glycol", as used herein in the singular, unless otherwise indicated, means copolyether glycols having a molecular weight of from about 130 to about 400 dalton. An example of a linear short chain copolyether glycol is $HOCH_2CH_2OCH_2CH_2CH_2CH_2OH$.

The term "THF", as used herein, unless otherwise indicated, means tetrahydrofuran and includes within its meaning, as defined herein, alkyl substituted tetrahydrofuran capable of copolymerizing with THF, for example 2-methyltetrahydrofuran, 3-methyltetrahydrofuran, and 3-ethyltetrahydrofuran.

The term "alkylene oxide", as used herein, unless otherwise indicated, means a compound containing two, three or four carbon atoms in its alkylene oxide ring. The alkylene oxide can be unsubstituted or substituted with, for example, linear or branched alkyl of 1 to 6 carbon atoms, or aryl which is unsubstituted or substituted by alkyl and/or alkoxy of 1 or 2 carbon atoms, or halogen atoms such as chlorine or fluorine. Examples of such compounds include ethylene oxide; 1,2-propylene oxide; 1,3-propylene oxide; 1,2-butylene oxide; 1,3-butylene oxide; 2,3-butylene oxide; styrene oxide; 2,2-bis-chloromethyl-1,3-propylene oxide; epichlorohydrin; perfluoroalkyl oxiranes, for example (1H,1H-perfluoropentyl) oxirane; and combinations thereof.

The term "oligomeric cyclic ether" (OCE), as used herein in the singular, unless otherwise indicated, means one or more of the series of cyclic compounds comprised of constituent ether fragments derived from at least one alkylene oxide and/or THF and arranged in a random fashion within the cyclic compound. Although used herein as a singular term, OCE refers to the distribution of cyclic ethers formed during polymerization of the THF and at least one alkylene oxide and thus refers to a series of individual compounds. As used herein, the term OCE excludes the dimer of the alkylene oxide co-monomer used in the polymerization, even though such a dimer is an example of cyclic ether. For example, in the case where the alkylene oxide is ethylene oxide, the dimer of the alkylene oxide is 1,4-dioxane. By excluding the dimer of the alkylene oxide from the term OCE, this definition of OCE may differ from that of OCE disclosed in the prior art.

In the case of copolymerization of, for example, ethylene oxide and THF, OCE comprises the series of cyclic oligomeric ethers comprised of ring-opened ethylene oxide and ring-opened THF repeat units, as represented by the formula $[(CH_2CH_2O)_x(CH_2CH_2CH_2CH_2O)_y]_n$. Examples of such OCE components are shown in Table A below. Two isomers were observed for molecular weight 232. Other higher molecular weight OCE components not listed in the Table are likely formed as well.

TABLE A

Individual OCE's Identified in EO/THF Polymerization

| Value for x | Value for y | Molecular weight |
|---|---|---|
| 1 | 2 | 188 |
| 1 | 3 | 260 |
| 1 | 4 | 332 |
| 1 | 5 | 404 |
| 2 | 2 | 232 |
| 2 | 3 | 304 |
| 2 | 4 | 376 |
| 3 | 1 | 204 |
| 3 | 2 | 276 |
| 3 | 3 | 348 |
| 4 | 2 | 320 |
| 4 | 3 | 392 |

One embodiment of the present invention is a process for the copolymerization of THF and alkylene oxide which minimizes or avoids OCE yield loss and/or copolyether glycol contamination with OCE. Another embodiment is a process for the copolymerization of THF and ethylene oxide which minimizes or avoids OCE yield loss and/or copolyether glycol contamination with OCE.

The THF used as a reactant in the process of the invention can be any of those commercially available. Typically, the THF has a water content of less than about 0.03% by weight and a peroxide content of less than about 0.005% by weight. If the THF contains unsaturated compounds, their concentration should be such that they do not have a detrimental effect on the polymerization process of the present invention or the polymerization product thereof. For example, for some applications it is preferred that the copolyether glycol product of the present invention has low APHA color, such as, for example less than about 250 APHA units. Optionally, the THF can contain an oxidation inhibitor such as butylated hydroxytoluene (BHT) to prevent formation of undesirable byproducts and color. If desired, one or more alkyl substituted THF's capable of copolymerizing with THF can be used as a co-reactant, in an amount from about 0.1 to about 70% by weight of the THF. Examples of such alkyl substituted THF's include 2-methyltetrahydrofuran, 3-methyltetrahydrofuran, and 3-ethyltetrahydrofuran.

The alkylene oxide used as a reactant in the present process, as above indicated, may be a compound containing two, three or four carbon atoms in its alkylene oxide ring. It may be selected from, for example, the group consisting of ethylene oxide; 1,2-propylene oxide; 1,3-propylene oxide; 1,2-butylene oxide; 2,3-butylene oxide; 1,3-butylene oxide and combinations thereof. Preferably, the alkylene oxide has a water content of less than about 0.03% by weight, a total aldehyde content of less than about 0.01% by weight, and an acidity (as acetic acid) of less than about 0.002% by weight. The alkylene oxide should be low in color and non-volatile residue.

If, for example, the alkylene oxide reactant is EO, it can be any of those commercially available. Preferably, the EO has a water content of less than about 0.03% by weight, a total aldehyde content of less than about 0.01% by weight, and an acidity (as acetic acid) of less than about 0.002% by weight. The EO should be low in color and non-volatile residue.

Examples of compounds containing reactive hydrogen atoms which are suitable for use in the process of this invention include water, 1,4-butanediol, PTMEG having a molecular weight of from about 162 to about 400 dalton, copolyether glycols having a molecular weight of from about 134 to 400 dalton, and combinations thereof. An example of a suitable copolyether glycol for use as a compound containing reactive hydrogen atoms is poly(tetramethylene-co-ethyleneether) glycol having a molecular weight of from about 134 to about 400 dalton.

The acid catalyst useful in the present invention includes broadly any strong acid and super acid catalyst capable of ring-opening polymerization of cyclic ethers as generally known in the art. The catalyst may be homogeneous or heterogeneous. Heterogeneous catalysts may be used in extrudate form or in suspension. The use of a heterogeneous catalyst may facilitate separation of product from the catalyst, especially when the catalyst is used in extrudate form.

Suitable homogeneous acid catalysts for use herein include, by way of example but not by limitation, heteropolyacids as disclosed, for example, in U.S. Pat. No. 4,658,065.

Suitable heterogeneous acid catalysts for use herein include, by way of example but not by limitation, zeolites optionally activated by acid treatment, sulfate-doped zirconium dioxide, supported catalysts comprising at least one catalytically active oxygen-containing molybdenum and/or tungsten compound or a mixture of such compounds applied to an oxidic support, polymeric catalysts which contain sulfonic acid groups (optionally with or without carboxylic acid groups), and combinations thereof.

Natural or synthetic zeolites, a class of aluminum hydrosilicates (also known as crystalline aluminosilicates), having an open structure of three-dimensional networks with defined pores and channels in the crystal, may be used as heterogeneous acid catalysts in the process of the present invention. Suitable zeolites for use herein have a $SiO_2/Al_2O_3$ molar ratio ranging from about 4:1 to about 100:1, for example from about 6:1 to about 90:1, or from about 10:1 to about 80:1. The particle size of the zeolite may be less than about 0.5 micron, for example less than about 0.1 micron, or less than about 0.05 micron. The zeolites are used in the hydrogen (acid) form and may optionally be activated by acid treatment.

Preparation of sulfate-doped zirconium dioxide is disclosed, for example, in U.S. Pat. No. 5,149,862.

Also useful as heterogeneous catalysts are those comprising at least one catalytically active oxygen-containing molybdenum and/or tungsten compound or a mixture of such compounds applied to an oxidic support as disclosed, for example, in U.S. Pat. No. 6,197,979. Examples of suitable oxidic supports include zirconium dioxide, titanium dioxide, hafnium oxide, yttrium oxide, iron (III) oxide, aluminum oxide, tin (IV) oxide, silicon dioxide, zinc oxide or mixture of these oxides. The supported catalysts may be, for example, additionally doped with sulfate or phosphate groups, as disclosed in German patent application DE-A 44 33606, pretreated with a reducing agent as described in DE 196 41481, or calcined and further comprising a promoter comprising at least one element or compound of an element of groups 2, 3 (including the lanthanides), 5, 6, 7, 8, and 14 of the periodic table of the elements, as disclosed in DE 196 49803.

Among the suitable polymeric catalysts which contain sulfonic acid groups, optionally with or without carboxylic acid groups, are those whose polymer chains are copolymers of tetrafluoroethylene or chlorotrifluoroethylene and a perfluoroalkyl vinyl ether containing sulfonic acid group precursors (again with or without carboxylic acid groups) as disclosed in U.S. Pat. Nos. 4,163,115 and 5,118,869 and as supplied commercially by E.I. du Pont de Nemours and Company under the tradename Nafion®. Such polymeric catalysts are also referred to as polymers comprising alpha-fluorosulfonic acids. An example of this type of catalyst for use herein is a perfluorosulfonic acid resin, i.e. it comprises a perfluorocarbon backbone and the side chain is represented by the formula —O—$CF_2CF(CF_3)$—O—$CF_2CF_2SO_3H$. Polymers of this type are disclosed in U.S. Pat. No. 3,282,875 and can be made by copolymerization of tetrafluoroethylene (TFE) and the perfluorinated vinyl ether $CF_2$=CF—O—$CF_2CF(CF_3)$—O—$CF_2CF_2SO_2F$, perfluoro (3,6-dioxa-4-methyl-7-octenesulfonyl fluoride) (PDMOF), followed by conversion to sulfonate groups by hydrolysis of the sulfonyl fluoride groups and ion exchanged as necessary to convert them to the desired acidic form. The perfluorosulfonic acid resin type of polymeric heterogeneous catalyst can be pretreated (hydrotreated) by placing it along with deionized water at a weight ratio of resin/water of from about ¼ to about ¹⁄₁₀ into a clean stainless steel autoclave, heating to a temperature of, for example, from about 170° C. to about 210° C. under agitation, and holding at that temperature for up to about 12 hours, for example from about 1 hour to about 8 hours.

The heterogeneous catalysts which can be employed according to the present invention can be used in the form of powders or as shaped bodies, for example in the form of beads, cylindrical extrudates, spheres, rings, spirals, or granules.

The polymerization step a) of the present invention may be carried out with or without a solvent. Excess THF may serve as a solvent for the polymerization process step, or an inert solvent, such as one or more aliphatic, cycloaliphatic, or aromatic hydrocarbons, may be used if desired. It is also possible to use the dimer(s) of the alkylene oxide(s) comonomers, for example 1,4-dioxane in the case of ethylene oxide, as a solvent, alone or in conjunction with another solvent, for example THF.

The polymerization step of the present invention is generally carried out at from about 50° C. to about 80° C., for example from about 56° C. to about 72° C. Such a temperature range is suitable for OCE incorporation into the copolyether glycol product. The pressure employed is generally not critical to the result of the polymerization, and pressures such as atmospheric pressure, the autogenous pressure of the polymerization system, and elevated pressures may be used.

To avoid the formation of peroxides, the polymerization step of the present process may be conducted under an inert gas atmosphere. Non-limiting examples of suitable inert gases for use herein include nitrogen, carbon dioxide, or the noble gases.

The polymerization step of the present invention can also be carried out in the presence of hydrogen at hydrogen pressure of from about 0.1 to about 10 bar.

The process of the invention can be carried out continuously, or with one or more steps of the process being carried out batchwise.

The polymerization reaction can be carried out in conventional reactors or reactor assemblies suitable for continuous processes in a suspension or fixed-bed mode, for example in loop reactors or stirred reactors in the case of a suspension process or in tube reactors or fixed-bed reactors in the case of a fixed-bed process. A continually stirred tank reactor (CSTR) is desirable due to the need for good mixing in the present process, especially when the products are produced in a single pass mode.

When a continuous polymerization reactor apparatus is used, the catalyst can, if desired, be pretreated after it has been introduced into the reactor(s). Examples of catalyst pretreatments include drying by means of gases, for example air or nitrogen, which have been heated to 80-200° C., or, in the case of supported catalysts comprising a catalytically active amount of at least one oxygen-containing molybdenum and/or tungsten compounds, pretreatment with a reducing agent as is disclosed in DE 19641481. The catalyst can also be used without pretreatment.

In a fixed-bed process, the polymerization reactor apparatus can be operated in the upflow mode, that is, the reaction mixture is conveyed from the bottom upward, or in the downflow mode, that is, the reaction mixture is conveyed through the reactor from the top downward.

The polymerization reactor can be operated using a single pass without internal recirculation of product, such as in a CSTR. The polymerization reactor can also be operated in the circulation mode, i.e., the polymerization mixture leaving the reactor is circulated. In the circulation mode, the ratio of recycle to feed is less than 100:1, for example less than 50:1, or for example less than 40:1.

Feeds can be introduced to the polymerization reactor using delivery systems common to current engineering practice either batchwise or continuously. A preferred method of feed delivery combines EO and THF as a liquid mixed feed to the reactor, for example a CSTR, in continuous fashion along with the other feed ingredients. The compound containing reactive hydrogen and recycled OCE streams are metered independently or in ratio-fashion to the reactor. Part of or the entire recycled THF-rich stream separated downstream of the polymerization reactor can be used in place of part of the neat THF feed. Ranges of EO in the feed are from about 1 to about 40 wt %, for example from about 10 to about 30 wt %. Ranges of THF in the feed are from about 10 to about 98 wt %, for example from about 20 to about 88 wt %. Ranges of OCE in the feed are from 0 (prior to recycle of OCE stream separated downstream) to about 20 wt %, for example from about 3 to about 15 wt %. Ranges of linear short chain copolyether glycols in the feed are from 0 (prior to recycle of OCE stream separated downstream) to about 10 wt %, for example from 0 (prior to recycle of OCE stream separated downstream) to about 5 wt %. Ranges of the compound containing reactive hydrogen are from about 0.1 to about 5 wt % as water, for example from about 0.1 to about 2 wt %.

If the polymerization has been carried out in the suspension mode, the major part of the polymerization catalyst requires separation from the polymerization product mixture in the work-up of the output from the polymerization step, for example by filtration, decantation or centrifugation. In other words, the resulting polymerization product mixture may be passed directly to the step of separation of THF and alkylene oxide dimer from the polymerization product mixture, or optionally it may be treated first to remove any catalyst fines or downstream products of the catalyst before being passed to the separation step. If the polymerization has been carried out in the fixed-bed mode, the output from the polymerization step may be passed directly to the separation step, or optionally it may be treated first to remove any catalyst fines or downstream products of the catalyst before being passed to the separation step.

The molar concentration of alkylene oxide, e.g. ethylene oxide, in the copolyether glycol product from the polymerization reaction step is from about 15 to about 60 mole %. The concentration of the copolyether glycol in the polymerization reaction step product stream is less than about 75 wt %.

The step b) of separating a majority of the THF and alkylene oxide dimer, and the alkylene oxide, from the polymerization product mixture can be carried out either batchwise or continuously. By majority of THF and dimer in this step we mean from at least about 98 wt % to about 100 wt %, for example at least about 99 wt %. The separation is performed by distillation which separates the majority of the THF, the alkylene oxide, the alkylene oxide dimer, and any low boilers such as acetaldehyde or 2-methyl-1,3-dioxolane from the polymerization product mixture. The separation of the THF in this step can in principle be carried out in one distillation step, or it can be carried out in a plurality of distillation steps, for example two or three distillation steps followed by a stripping step. It is advantageous to carry out the distillation steps under different pressures.

The configuration of the separation operation is dependent on the alkylene oxide and the compound(s) containing reactive hydrogen atoms used in the polymerization step. Depending on the separation task, possible distillation apparatuses are appropriate columns or evaporators such as falling film evaporators or thin film evaporators. It may also be advantageous to use tray or packed columns.

Following are disclosed in more detail various non-limiting embodiments for the separation of THF and alkylene oxide dimer from the polymerization product mixture when using THF, ethylene oxide (EO), and water in the polymerization step.

The removal of the major part of the unreacted THF at nearly atmospheric pressure (for example, at 450-900 mm) may be carried out in a continuously operated circulating flash evaporator. The polymerization product mixture, optionally having been filtered to remove any catalyst fines or downstream products of the catalyst, is fed into a flash evaporator via a heated circulation stream into the side near the top of the evaporator where it flashes. The polymerization product mixture from step a) usually has a THF content of from about 5 wt % to about 30 wt %, dependent upon the operating temperature and pressure selected. The water content is generally not more than about 150 ppm, the alkylene oxide, e.g. EO, content is from about 20 ppm to about 500 ppm, and the 2-methyl-1,3-dioxolane concentration is from about 200 ppm to about 1500 ppm. Other compounds such as ethylene glycol (typically from about 100 ppm to about 1000 ppm) and 1,4-butanediol (typically from about 30 ppm to about 300 ppm) are also present. At a circulating temperature at the top of from about 100° C. to about 160° C. and a temperature at the bottom of from about 100° C. to about 200° C., for example from about 100° C. to about 120° C., the major part of the water, alkylene oxide, e.g., EO, and acetaldehyde in admixture with THF is distilled off via the top. The tetrahydrofuran fraction obtained as distillate is condensed and all or some of it, such as for example at least about 99%, can be subsequently returned to the polymerization step after purification, for example by distillation. The crude product mixture obtained as distillation residue at the bottom of the evaporator comprises copolyether glycol, OCE, THF, dimer of the alkylene oxide, e.g. 1,4-dioxane, and other low boilers.

As an alternative, the removal of the major part of the unreacted THF at atmospheric pressure can be carried out in a thin film evaporator or distillation column, for example a falling film evaporator with circulation, which is operated at from about 100° C. to about 200° C., for example from about 120° C. to about 180° C. The composition of the THF fraction obtained as distillate and that of the crude product mixture obtained as distillation residue correspond to those described above.

The distillation residue obtained from the first distillation step is subsequently freed of most of the residual THF under reduced pressure, for example in a second circulating flash evaporator operating at about 100° C. to about 150° C. (for example at about 120° C.) and from about 80 mm Hg to about 160 mm Hg (for example at about 130 mm Hg) with the circulation temperature from about 2° C. to about 5° C. higher than the evaporator temperature. Crude product leaving from the second recovery step generally contains less than about 10 ppm EO, less than about 50 ppm water, less than about 200 ppm of 2-methyl-1,3-dioxolane, less than about 3000 ppm 1,4-dioxane, and less than about 1.5 wt % THF. All or some of the THF fraction obtained as distillate, which comprises predominantly THF, such as for example at least about 99%, can be returned to the polymerization step after purification in the distillation column.

To reduce the remaining THF and dimer, e.g. 1,4-dioxane, a third step using ultra low vacuum, for example less than 3 torr, or inert gas stripping, for example with nitrogen, can be employed. The third step could use thin film evaporators, wiped film evaporators, disc and donut contactors, or packed columns. For example, when using nitrogen stripping in a packed column with nitrogen at about 170° C. feed at the bottom and crude product at about 120° C. feed at the top, the crude product leaving the bottom of the column might have only dropped by about 1to 2° C., for example to about 118° C.-119° C. The EO and water content would generally be less than about 1 ppm, the 2-methyl-1,3-dioxolane concentration less than about 3 ppm, the THF concentration less than about 40 ppm, and the 1,4-dioxane concentration less than about 250 ppm. Other high boiling compounds like ethylene glycol and 1,4-butanediol would be slightly reduced but would mainly remain in the crude product.

After a majority of the THF and the alkylene oxide dimer have been separated from the polymerization product mixture to produce a crude product mixture comprising OCE, copolyether glycol and linear short chain copolyether glycol, the crude product mixture may be treated to remove any catalyst fines or downstream products of the catalyst before being passed to the step of separation of at least a portion of the OCE from the crude product mixture.

Either or both of the polymerization product mixture and the crude product mixture may be treated to remove any catalyst fines or downstream products of the catalyst which may result, for example, from attrition of or leaching of the catalyst during pretreatment or during polymerization. Examples of these include finely divided, suspended or emulsified abraded catalyst comprising unchanged catalyst, the catalyst support and/or the active catalyst component. In the case of supported catalysts comprising an oxidic support material to which oxygen-containing molybdenum or tungsten compounds or mixtures of such compounds have been applied as catalytically active compounds, the abraded material is accordingly unchanged catalyst, support material and/or active oxygen-containing molybdenum or tungsten components. Downstream products of the catalyst are, for example, dissolved cations or anions of the active components, for example tungsten or molybdenum cations or molybdate or tungstate anions. In the case of ion exchangers containing sulfonic acid groups, for example Nafion®, the downstream product can include fluoride ions and/or sulfonic acids; in the case of the sulfate-doped metal oxides, the downstream product can include sulfuric acid and/or metal cations or anions.

Although the amount of such catalyst and/or downstream products of the catalyst is small and generally does not exceed 0.1% by weight, for example 0.01% by weight, based on the output from the polymerization step, this material should be removed or it would otherwise remain in the copolyether glycol and change the specification data and thereby the properties of the copolyether glycol product.

The catalyst and/or downstream products of the catalyst can be separated from the polymerization product mixture and/or the crude product mixture by filtration, for example ultrafiltration, adsorption on solid adsorbents, for example activated carbon, and/or by means of ion exchangers, for example molecular sieves having pore sizes of from 3 to 10 angstroms. Adsorption on solid adsorbents can also be combined with neutralization using acids or bases.

Separating in step c) of at least a portion, such as from about 4 to about 30 wt %, for example from about 4 to about 20 wt %, of the OCE from the crude product mixture, and from about 1 to about 10 wt %, for example from about 1 to about 8 wt %, of the linear short chain copolyether glycol from the crude product mixture of step b) to produce an OCE stream comprising OCE and linear short chain copolyether glycol, and a product stream comprising from about 60 to about 95 wt %, for example from about 72 to about 95 wt %, copolyether glycol can be carried out in practice by distillation using a conventional reduced pressure distillation apparatus. For example, distillation can be carried out batchwise from a batch distillation apparatus, without rectification. Short-path distillation apparatuses, for example conventional film evaporators with mechanical surface distribution or automatic distribution, are advantageous. In the case of the film evaporators, the continuous procedure is generally preferred, whereas distillation from a batch distillation apparatus is carried out batchwise in most cases. Flash evaporators are also suitable for separating off the OCE. In these apparatuses, the required evaporation energy is introduced into the product in the form of sensible heat, after which the product is let down into a suitable vessel under reduced pressure. During this procedure, the OCE present therein is vaporized. The distillation can be reinforced by additional stripping with an inert gas, such as nitrogen or superheated steam. For this purpose, available thin film evaporators, falling film evaporators and/or short path distillation units are useful.

In this separation step c), OCE and low molecular weight copolyether glycols having a mean molecular weight of from about 200 to about 700 dalton are separated in at least one distillation step at a pressure of from about 0.1 to about 130 μbar, for example from about 1 to about 90 μbar, or for example from about 10 to about 70 μbar, and at a temperature of from about 180° C. to about 280° C., for example from about 200° C. to about 250° C., or for example from about 210° C. to about 250° C., and copolyether glycols having a mean molecular weight of from about 650 dalton to about 5000 dalton are isolated.

In step d) a majority, such as greater than about 50 wt %, for example from greater than about 50 wt % to about 100 wt %, of the OCE stream of step c) is recycled to polymerization step a).

Referring more particularly to the drawings, FIG. 1 shows an embodiment of the present invention wherein feedstock comprising, for example, 13.0 parts EO, 73.6 parts THF and 0.4 parts water enters polymerization reactor 10, containing, for example, 8 parts catalyst, via line 1. Polymerization product mixture exits reactor 10 and enters filtration system 11 via line 2. Effluent from filtration system 11 enters separation system 20 via line 3. From separation system 20 a majority of the THF and product dimer and low boiling compounds exit via line 5, while crude product mixture comprising OCE, linear short chain copolyether glycol and copolyether glycol product exit via line 4. The line 4 composition enters filtration system 21 and the filtered composition enters separation system 30 via line 6. Line 7 from separation system 30 comprises the product copolyether glycol, and line 8 from separation system 30 comprises an OCE stream comprising OCE and linear short chain copolyether glycol. A portion of the recovered OCE stream (for example, 13 parts) in line 8 is fed to polymerization reactor 10 via line 9.

Figure 2:
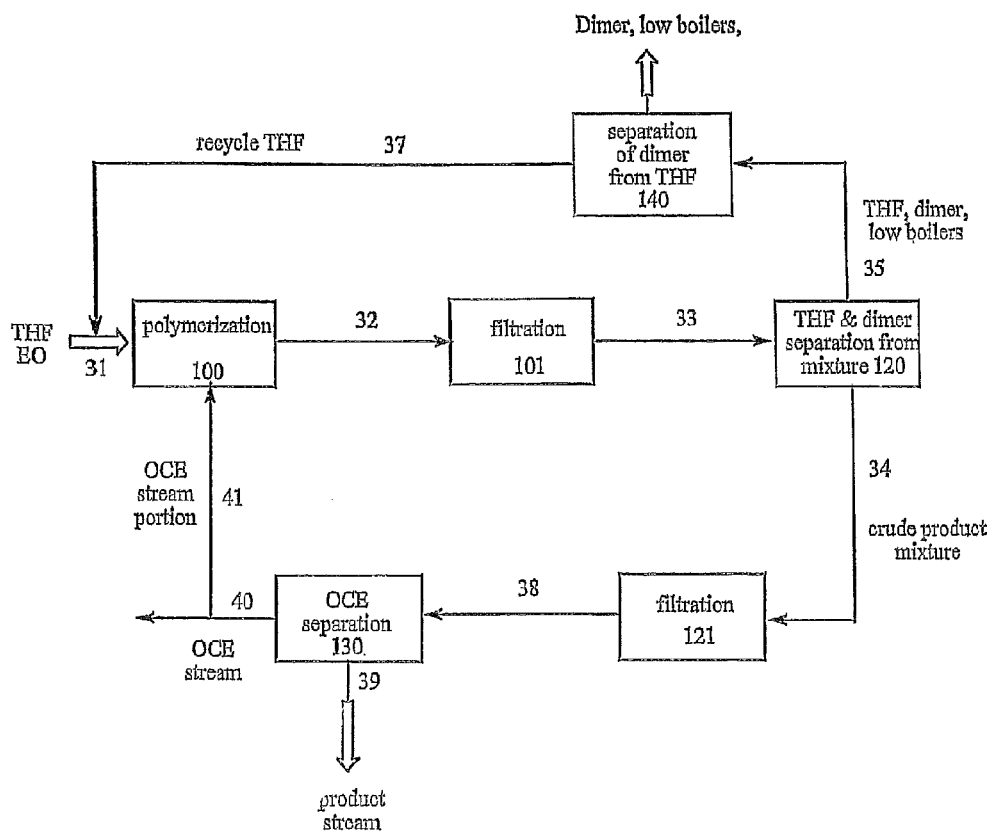
FIG. 2 shows a diagrammatic flow of another embodiment of the present process including separating at least a portion of the dimer of the alkylene oxide from the tetrahydrofuran.

FIG. 2 shows another embodiment of the present invention wherein feedstock comprising, for example, 13.0 parts EO, 73.6 parts THF and 0.4 parts water enters polymerization reactor 100, containing, for example, 8 parts catalyst, via line 31. Polymerization product mixture exits reactor 100 and enters filtration system 101 via line 32. Effluent from filtration system 101 enters separation system 120 via line 33. From separation system 120 a majority of the THF and product dimer and low boiling compounds exit via line 35, while crude product mixture comprising OCE, linear short chain copolyether glycol and copolyether glycol product exit via line 34. The line 35 composition enters separation system 140 and product dimer, low boiling compounds and some THF exit the separation system 140 via line 36, while separated THF exits separator system 140 via line 37 for addition to line 31. The line 34 composition enters filtration system 121 and the filtered composition enters separation system 130 via line 38. Line 39 from separation system 130 comprises the product copolyether glycol, and line 40 from separation system 130 comprises an OCE stream comprising OCE and linear short chain copolyether glycol. A portion of the recovered OCE stream (for example, 13 parts) in line 40 is fed to polymerization reactor 100 via line 41.

The following Examples demonstrate the present invention and its capability for use. The invention is capable of other and different embodiments, and its several details are capable of modifications in various apparent respects, without departing from the scope and spirit of the present invention. Accordingly, the Examples are to be regarded as illustrative in nature and not as restrictive.

Materials

THF was obtained from Chemcentral. EO was purchased from ARC Specialty Products and was used without further purification. The NR50 Nafion® perfluorinated sulfonic acid resin was obtained from E.I. du Pont de Nemours, Wilmington, Del., USA, and hydrotreated (pretreated) as above indicated. The filter aid was purchased from Aldrich Chemical, and deionized water was used.

Unless indicated otherwise, in the following Examples the material used as "OCE feed" was composite material that had been obtained previously as distillate from short path distillation of filtered crude copolyether glycol samples. The OCE feed contained 92.7 wt % oligomeric cyclic ethers (MW range of from 188 to 404 dalton) and 7.3 wt % linear short chain copolyether glycols.

Analytical Methods

The conversion to copolymers is defined by the weight percent of non-volatiles in the crude product mixture collected from the reactor exit, which was measured by a vacuum oven (130° C. and about 200 mmHg) removal of the volatiles in the crude product mixture.

Both molecular weight and percent incorporation of alkylene oxide were measured by $^1$H NMR per ASTM method D 4875. Molecular weight may also be determined by titration of hydroxyl end groups per ASTM method E 222.

The short chain glycol and OCE contents were determined by gas chromatography using a DB1701 column of 5 meter length with an FID detector. Temperature programming was commenced at 50° C., held for 2 minutes at 50° C., then ramped at 20° C./minute to 250° C., held at 250° C. for 22.5 minutes, then reduced to 50° C. Sample dilution was 1:4 by weight with toluene; and sample injection size was 1 microliter.

Determination of % OCE made and % OCE incorporation into polymer was determined for all the examples as follows: For Example 1 discussed below, the analysis of the reactor exit mixture showed that the overall conversion was 59.0%, low molecular weight oligomers that were removed by the short path distillation unit was 18.51%, the molecular weight of the final product was 2612 g/mole and the EO incorporation in the product reached 40.7 mole %. The % OCE in the product=% OCE in the crude product, defined as copolyether glycol+OCE multiplied by the overall conversion=18.51%× (59.0%/100)=10.92%. Therefore, % OCE net made in the reactor=% OCE in the product minus % OCE in the feed=10.92%−12.42%=−1.50%. Since the net OCE made is less than zero, OCE generated plus 1.50% more was incorporated into the co-polymer glycol structure.

Hydroxyl number was determined by titration of hydroxyl end groups per ASTM method E 222.

The APHA color of the products was determined per ASTM method D 4890.

The polydispersity was determined by GPC, which was performed with an HP 1090 series II liquid chromatography with a Waters Ultrastyragel 500 Å column. THF was used as eluant. Polystyrene and PTMEG standards were used for calibration. The polydispersity was calculated as the ratio between the Mw/Mn.

The equivalent weight of water in the linear small chain copolyether glycols was determined using hydroxyl number measurement as discussed above. This is required to make adjustments to the amount of chain terminating agent to attain the desired molecular weight of the copolymer product. For Example 1 below, the average molecular weight of the OCE and short chain polyols recycled in the feed was 3093 g/mole. The water equivalent was calculated in the following manner: 1580 grams OCE and short chain polyols divided by 3093 g/mole and multiplied by 18 g/mole=9.347 grams of water.

To determine catalyst and process efficiency in making the final polyether polyol product, we calculate the Space Time Yield (STY) based on the catalyst, which is in the unit of grams of final polyol produced per gram of catalyst per hour, i.e. g polyol/g cat.hr. In particular, STY=flow rate (g/hr)× conversion (wt %)×polyol (wt %, 100% minus the low molecular weight oligomers removed by short path distillation)/catalyst weight (g). The STY of the present process is greater than about 0.9, for example from about 1.0 to about 3.0. To demonstrate this, for Example 1 below, the STY=160 (g/hr)×59.0 wt %×(100−18.51)(wt %)/44 (g)=1.74 g polyol/g cat.hr. All of the STY values were calculated for the specific examples below and are shown in Table D.

EXAMPLES

All parts and percentages are by weight unless otherwise indicated.

Catalyst Preconditioning

Before use in the polymerization experiments described below, 90 grams (dry basis) of perfluorosulfonic acid resin catalyst having been hydrotreated as above indicated, and 14 grams of water were loaded into a jacketed one liter stainless steel CSTR reactor system. The catalyst was conditioned by feeding 4.8 wt % EO and 0.24 wt % water in THF for 24 hours at 58° C. with a 1.5 hour hold time. The catalyst was then treated with the same feed for 18 hours at 60° C. with a 1.2 hour hold time. The feed was then discontinued and the reactor system was allowed to cool to about 30° C. The catalyst was unloaded, filtered, rinsed with THF and then dried on a Buckner funnel at ambient conditions under the pull of house vacuum. After drying, the catalyst contained 13.5 wt % volatiles as determined by oven drying the catalyst at 130° C.

Example 1

A liquid mixture of 1580 grams of OCE and short chain polyols and 33.1 grams of deionized water was charged to 8490 grams of THF in an air free 5 gallon vessel equipped with an agitator and a three baffle set. The agitator was energized and 1616 grams of EO was added to the THF solution with cooling water supplied to the vessel. After 0.5 hour of mixing, the mixture was transferred to a 4 gallon mixture transfer tank. The feed mixture was fed to a supply tank, made inert with nitrogen in the free space, and fed to a jacketed 0.5 liter stainless steel CSTR reactor system using a metering pump. The agitator in the reactor was equipped with a single set of impellors pitched 45 degrees to provide downward pumping of the reactor contents. The liquid feed entered at the same height as the bottom impellor.

The jacketed 0.5 liter reactor system was loaded with 44 grams of the perfluorosulfonic acid resin catalyst. The reactor was filled with a solution of 0.4 wt % deionized water and 99.6 wt % THF. The reactor mixture was heated to 68° C. at 500 rpm agitation and 40 psig nitrogen pressure while a feed solution was added at 160 grams/hour to give a 3 hour hold time. The feed solution comprised 13.79 wt % ethylene oxide, 12.42 wt % OCE, 0.97 wt % linear short chain copolyether glycol, 0.369 wt % deionized water, and the balance THF. The average molecular weight of the OCE added as recycle feed was 3093 dalton for a water equivalent of 9.347 grams of water. Also accounted for is the water content of the OCE feed and the THF which were 93 and 89 ppm, respectively. A steady-state condition was reached after about 8 turnovers in the reactor, as evidenced by constant percent conversion based on sample weight after roto-evaporation and by constant molecular weight of the copolyether glycol product.

The wt % EO and dioxane in the crude product was determined by GC on a sample collected after the reactor exit.

Product from the experiment (both steady state and non-steady state material) was kept as an individual sample and was roto-evaporated to remove the volatiles. The roto-evaporated sample was then characterized to determine % conversion level, OCE content and the APHA color.

After roto-evaporation, the sample was filtered. Filter aid (Celpure® 300) was added to the filter paper and to the sample. Then the sample was fed to the short path distillation unit (2 or 4 inch unit from Pope Scientific). Conditions were 190° C. wall temperature, 0.1 torr vacuum and with feed rate around 300 to 500 g/hr. After short path distillation, the residue, the copolyether glycol, was characterized for OCE content, MW, and mole % EO incorporated. The distillate, the OCE, was analyzed for short chain glycol content.

Analysis of the polymerization reactor exit mixture showed that the overall conversion was 59.0 wt %, the amount of low molecular weight oligomers removed by the short path distillation step was 18.51 wt %, the molecular weight of the final copolyether glycol product was 2612 dalton, and the EO incorporation was 40.7 mole %. Polydispersity of the copolyether glycol was 2.094 and color was 41 APHA units. The process STY was determined to be 1.74 g polyol/g cat.hr. Percent OCE produced and incorporated into the copolyether glycol was calculated as indicated above.

To determine how much water to use in the feed for this and the following experiments, it was necessary to account for the equivalent water contained in the OCE/linear short chain glycol feed component as indicated above.

Examples 2-12

Additional experiments with the reaction conditions indicated in Table B were performed similarly using the same batch of catalyst already in the reactor. When changing from one set of reaction conditions to another, a steady-state condition was typically reached after about 8 turnovers in the reactor. Product characteristics for these additional experiments are given in Table C and STY is shown in Table D.

Example 13

Example 13 was performed in order to use, as OCE feed, OCE which had already been through the process at least one additional cycle. For Example 13, OCE fractions obtained from the short path distillation of product from Examples 1, 6 and an earlier run made under similar conditions were composited and used as the OCE feed. The OCE feed used in Example 13 contained 96.8 wt % OCE (MW range of form 188 to 404 dalton) and 3.2 wt % linear short chain copolyether glycol. Example 13 was run with the same batch of catalyst under the conditions shown in Table B and gave product with characteristics as shown in Table C and STY as shown in Table D.

TABLE B

Polymerization Conditions

| Example # | Wt % EO in feed | Wt % OCE in feed | Wt % linear short chain glycol in feed | Wt % free water added in feed | Hold-up Time (hours) | Reactor Temp (° C.) |
|---|---|---|---|---|---|---|
| 2 | 4.80 | 16.56 | 1.29 | 0.247 | 2.0 | 62.1 |
| 3 | 4.80 | 16.56 | 1.29 | 0.247 | 1.2 | 72.4 |
| 4 | 5.90 | 13.52 | 1.05 | 0.301 | 1.2 | 61.7 |
| 5 | 5.90 | 13.52 | 1.05 | 0.301 | 2.0 | 72.4 |
| 6 | 13.79 | 12.42 | 0.97 | 0.369 | 3.0 | 67.5 |
| 7 | 26.89 | 11.04 | 0.86 | 0.670 | 3.5 | 62.4 |
| 8 | 26.89 | 11.04 | 0.86 | 0.670 | 6.0 | 62.1 |
| 9 | 26.96 | 5.52 | 0.43 | 0.669 | 6.0 | 62.4 |
| 10 | 26.96 | 5.52 | 0.43 | 0.669 | 3.5 | 72.4 |
| 11 | 37.35 | 25.05 | 1.95 | 0.813 | 4.0 | 62.5 |
| 12 | 37.35 | 25.05 | 1.95 | 0.813 | 5.5 | 56.3 |
| 13 | 13.80 | 12.91 | 0.59 | 0.369 | 3.0 | 67.4 |

(Note: OCE and linear short chain glycol were in same feed material)

TABLE C

Product Characteristics

| Ex# | A* | B* | C* | D* | E* | F* | G* | MW/Mn | Color (APHA) | Wt % OCE made or consumed % |
|---|---|---|---|---|---|---|---|---|---|---|
| 2 | 40.98 | 0.095 | 40.49 | 16.59 | 31.81 | 0.55 | 2104 | 2.547 | 67 | 0.03 |
| 3 | 38.78 | 0.090 | 39.89 | 15.47 | 33.22 | 0.18 | 2019 | 2.380 | 46 | −1.09 |
| 4 | 40.32 | 0.110 | 39.81 | 16.05 | 34.04 | 0.08 | 1929 | 2.282 | 47 | 2.53 |
| 5 | 41.05 | 0.106 | 29.87 | 12.26 | 33.98 | 0.09 | 2002 | 2.169 | 35 | −1.26 |
| 6 | 57.96 | 0.352 | 19.41 | 11.25 | 40.47 | 0.25 | 2650 | 2.167 | 32 | −1.17 |
| 7 | 72.79 | 1.529 | 13.35 | 9.72 | 52.56 | 0.12 | 2076 | 1.922 | 32 | −1.32 |
| 8 | 73.36 | 1.571 | 12.09 | 8.87 | 52.08 | 0.06 | 2115 | 1.851 | 30 | −2.17 |
| 9 | 70.76 | 1.455 | 8.28 | 5.86 | 51.18 | 0.06 | 2101 | 1.849 | 32 | 0.34 |
| 10 | 70.20 | 1.395 | 7.28 | 5.11 | 51.50 | 0.04 | 2083 | 1.839 | 138 | −0.41 |
| 11 | 83.38 | 4.345 | 20.37 | 16.98 | 64.06 | 0.09 | 1772 | 1.798 | 157 | −8.07 |
| 12 | 83.57 | 4.476 | 20.36 | 17.01 | 64.29 | 0.20 | 1756 | 1.860 | 78 | −8.04 |
| 13 | 59.05 | 0.379 | 18.59 | 10.98 | 40.96 | 0.08 | 2779 | 2.218 | 168 | −1.93 |

(Note: these results are averages of at least two samples taken at steady state)
*Footnotes:
A*—Over all % conversion
B*—Wt % dioxane in polymerization product
C*—Wt % OCE in product after roto-evaporation
D*—"OCE out" %
E*—Mole % EO incorporated in copolyether
F*—Wt % OCE in copolyether glycol
G*—MW of final copolyether glycol

TABLE D

| Example # | Space Time Yield (STY)* |
|---|---|
| 1 | 1.74 |
| 2 | 1.33 |
| 3 | 2.12 |
| 4 | 2.21 |
| 5 | 1.57 |
| 6 | 1.70 |
| 7 | 1.97 |
| 8 | 1.17 |
| 9 | 1.18 |
| 10 | 2.03 |
| 11 | 1.81 |
| 12 | 1.32 |
| 13 | 1.75 |

*STY = grams final copolyether glycol/grams catalyst · hour

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A process for manufacturing copolyether glycol having a mean molecular weight of from about 650 dalton to about 5000 dalton, said process exhibiting an STY of greater than about 0.9 g polyol/g cat.hr, comprising the steps of:
    a) polymerizing feed comprising a tetrahydrofuran and at least one alkylene oxide in the presence of an acid catalyst and at least one compound containing reactive hydrogen atoms at a temperature of from about 50° C. to about 80° C. to produce a polymerization product mixture comprising OCE, copolyether glycol, at least one dimer of the alkylene oxide, linear short chain copolyether glycol and tetrahydrofuran;
    b) separating a majority of the tetrahydrofuran and the dimer of the alkylene oxide from the polymerization product mixture of step a) to produce a crude product mixture comprising OCE, copolyether glycol and linear short chain copolyether glycol;
    c) separating at least a portion of the OCE and linear short chain copolyether glycol from the crude product mixture of step b) to produce an OCE stream comprising OCE and linear short chain copolyether glycol, and a product stream comprising copolyether glycol; and
    d) recycling at least a portion of the OCE stream of step c) to the polymerization step a) such that the feed comprises from about 3 to about 15 wt % OCE.

2. The process of claim 1 wherein the alkylene oxide is selected from the group consisting of ethylene oxide; 1,2-propylene oxide; 1,3-propylene oxide; 1,2-butylene oxide; 2,3-butylene oxide; 1,3-butylene oxide; and combinations thereof.

3. The process of claim 1 wherein the compound containing reactive hydrogen atoms is selected from the group consisting of water, 1,4-butanediol, poly(tetramethylene ether) glycol having a molecular weight of from about 130 dalton to about 400 dalton, copolyether glycols having a molecular weight of from about 130 dalton to about 400 dalton, and combinations thereof.

4. The process of claim 1 wherein the acid catalyst is selected from the group consisting of zeolites optionally activated by acid treatment, sulfate-doped zirconium dioxide, supported catalysts comprising at least one catalytically active oxygen-containing molybdenum and/or tungsten compound or a mixture of such compounds applied to an oxidic support, polymeric catalysts which contain sulfonic acid groups, and combinations thereof.

5. The process of claim 1 wherein the tetrahydrofuran comprises at least one alkyltetrahydrofuran selected from the group consisting of 2-methyltetrahydrofuran, 3-methyltetrahydrofuran, 3-ethyltetrahydrofuran and combinations thereof.

6. The process of claim 1 wherein the polymerization step a) is conducted in a continually stirred tank reactor.

7. The process of claim 1 wherein the separation of step b) comprises at least one distillation.

8. The process of claim 1 wherein the separation of step c) comprises an operation selected from the group consisting of short-path distillation, thin film evaporation, flash evaporation, nitrogen stripping in a packed column, solvent extraction and combinations thereof.

9. The process of claim 1 further comprising recycling to polymerization step a) at least a portion of the tetrahydrofuran obtained in step b).

10. The process of claim 1 further comprising separating at least a portion of the dimer of the alkylene oxide obtained in step b) from the tetrahydrofuran obtained in step b), and optionally recycling to polymerization step a) at least a portion of the tetrahydrofuran so obtained.

11. The process of claim 1 further comprising filtering the polymerization product mixture of step a) prior to step b), and filtering the crude product mixture of step b) prior to step c).

12. The process of claim 1 wherein the alkylene oxide comprises ethylene oxide and the dimer of the alkylene oxide comprises 1,4-dioxane.

13. The process of claim 12 wherein the temperature of step a) is from about 56° C. to about 72° C.

14. The process of claim 12 wherein the catalyst is a polymeric catalyst which contains sulfonic acid groups.

15. The process of claim 14 wherein the polymeric catalyst comprises a perfluorosulfonic acid resin.

16. The process of claim 12 further comprising separating at least a portion of the 1,4-dioxane obtained in step b) from the tetrahydrofuran obtained in step b), and optionally recycling to polymerization step a) at least a portion of the tetrahydrofuran so obtained.

17. A process for manufacturing poly(tetramethylene-co-ethyleneether) glycol having a mean molecular weight of from about 650 dalton to about 5000 dalton, said process exhibiting an STY of greater than about 0.9 g polyol/g cat.hr, comprising the steps of:
    a) polymerizing feed comprising tetrahydrofuran and ethylene oxide in the presence of an acid catalyst and at least one compound containing reactive hydrogen atoms selected from the group consisting of water, 1,4-butanediol, poly(tetramethylene ether) glycol having a molecular weight of from about 130 dalton to about 400 dalton, and poly(tetramethylene-co-ethyleneether) glycol having a molecular weight of from about 130 dalton to about 400 dalton, at a temperature of from about 50° C. to about 80° C., to produce a polymerization product mixture comprising OCE, poly(tetramethylene-co-ethyleneether) glycol, 1,4-dioxane, linear short chain copolyether glycol and tetrahydrofuran;
    b) separating a majority of the tetrahydrofuran and 1,4-dioxane from the polymerization product mixture of step a) to produce a crude product mixture comprising OCE, poly(tetramethylene-co-ethyleneether) glycol and linear short chain copolyether glycol;
    c) separating at least a portion of the OCE and linear short chain copolyether glycol from the crude product mixture of step b) to produce an OCE stream comprising OCE and linear short chain copolyether glycol, and a product stream comprising poly(tetramethylene-co-ethyleneether) glycol; and d) recycling at least a portion of the OCE stream of step c) to the polymerization step a) such that the feed comprises from about 3 to about 15 wt % OCE.

18. The process of claim 17 wherein the polymerization step a) is conducted in a continually stirred tank reactor.

19. The process of claim 17 further comprising recycling to polymerization step a) at least a portion of the tetrahydrofuran obtained in step b).

20. The process of claim 17 further comprising filtering the polymerization product mixture of step a) prior to step b), and filtering the crude product mixture of step b) prior to step c).

21. The process of claim 17 wherein the catalyst is a polymeric catalyst which contains sulfonic acid groups.

22. The process of claim 21 wherein the polymeric catalyst comprises a perfluorosulfonic acid resin.

23. The process of claim 17 further comprising separating at least a portion of the 1,4-dioxane obtained in step b) from the tetrahydrofuran obtained in step b), and optionally recycling to polymerization step a) at least a portion of the tetrahydrofuran so obtained.

24. A process for the single pass preparation of copolyether glycols by polymerizing feed comprising tetrahydrofuran and at least one alkylene oxide in the presence of an acid catalyst and at least one compound containing reactive hydrogen atoms, which comprises removing at least a portion of the dimer of the alkylene oxide formed and separating and recycling to the polymerization at least a portion of the OCE formed such that the feed comprises from about 3 to about 15 wt % OCE, said process exhibiting an STY of greater than about 0.9 g polyol/g cat.hr.

25. The process of claim 24 wherein the alkylene oxide is selected from the group consisting of ethylene oxide; 1,2-propylene oxide; 1,3-propylene oxide; 1,2-butylene oxide; 2,3-butylene oxide; 1,3-butylene oxide; and combinations thereof, the compound containing reactive hydrogen atoms is selected from the group consisting of water, 1,4-butanediol, poly(tetramethylene ether) glycol having a molecular weight of from about 130 dalton to about 400 dalton, copolyether glycols having a molecular weight of from about 130 dalton to about 400 dalton, and combinations thereof, and the acid catalyst is selected from the group consisting of zeolites optionally activated by acid treatment, sulfate-doped zirconium dioxide, supported catalysts comprising at least one catalytically active oxygen-containing molybdenum and/or tungsten compound or a mixture of such compounds applied to an oxidic support, polymeric catalysts which contain sulfonic acid groups, and combinations thereof.

* * * * *